Dec. 4, 1934.  A. J. PRANCE  1,983,189
THREAD CUTTING TOOL
Filed June 13, 1932   2 Sheets-Sheet 1
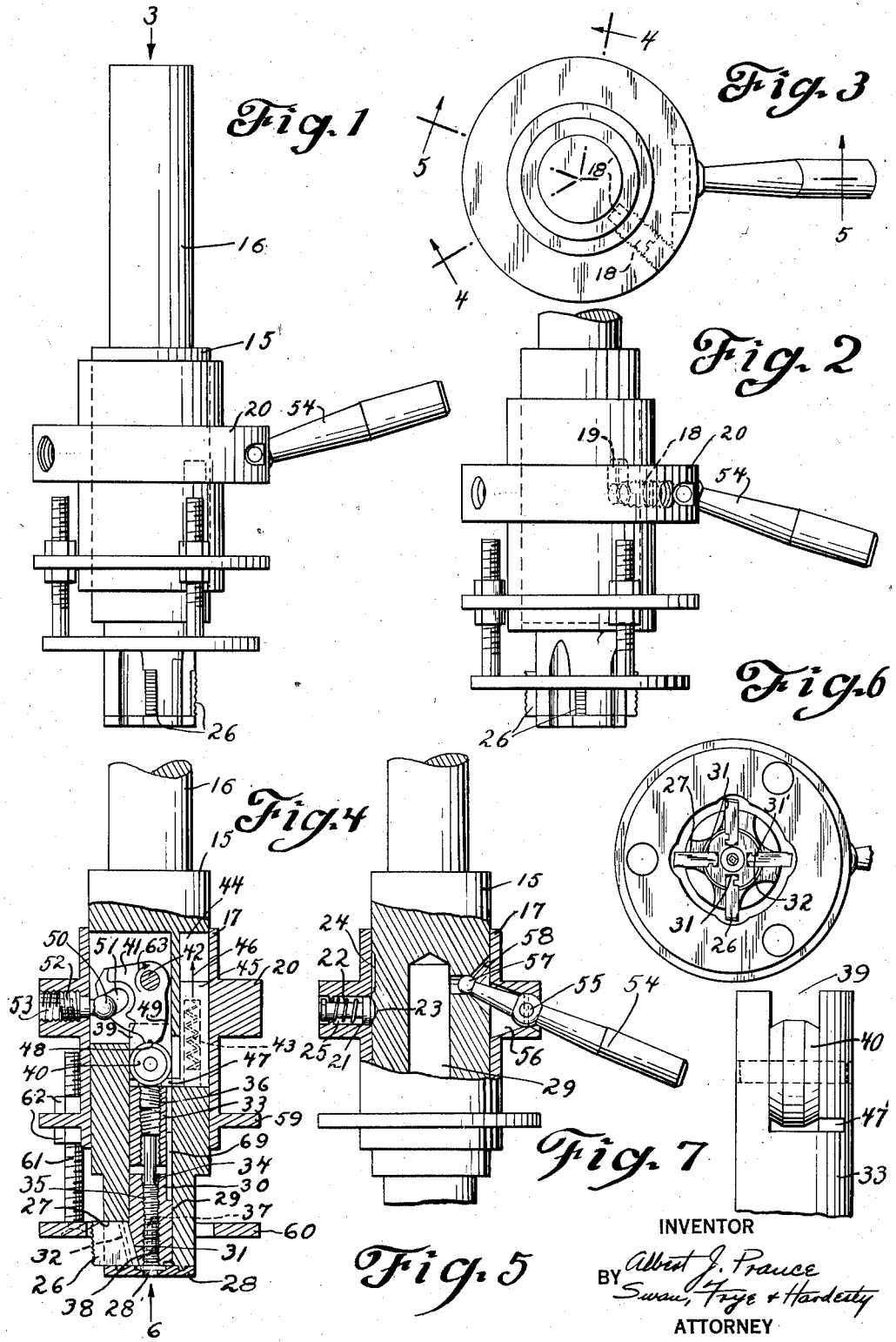
INVENTOR
Albert J. Prance
BY Swan, Frye & Hardesty
ATTORNEY

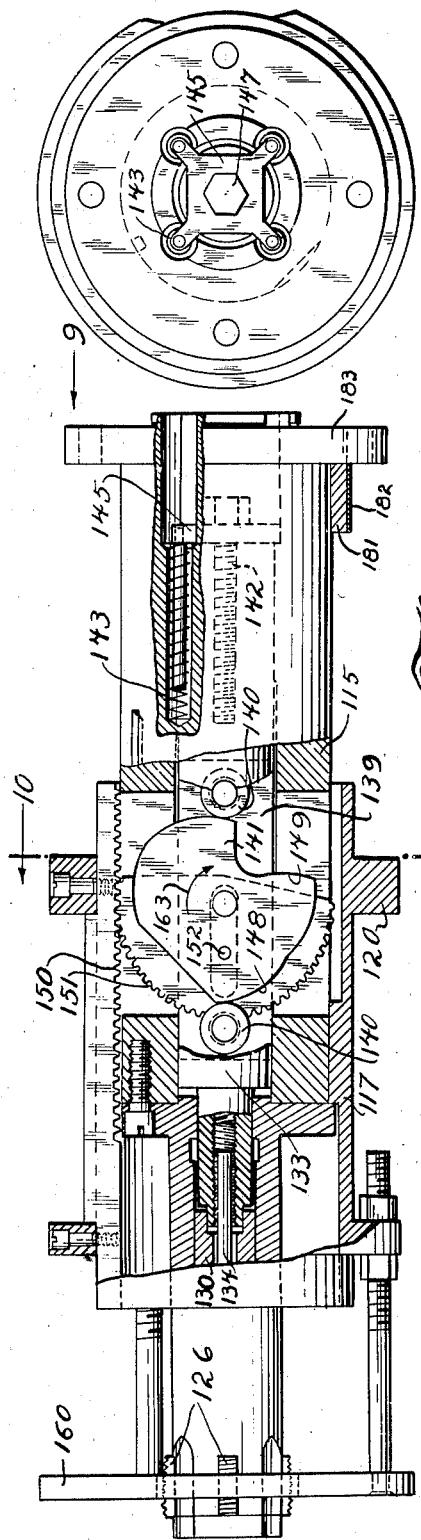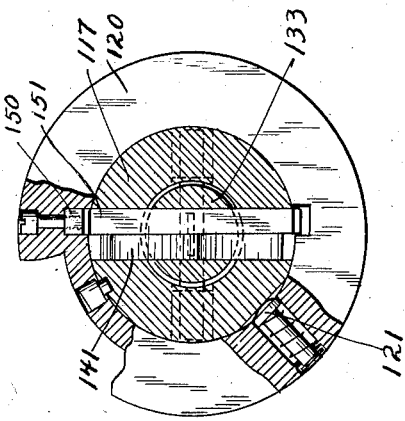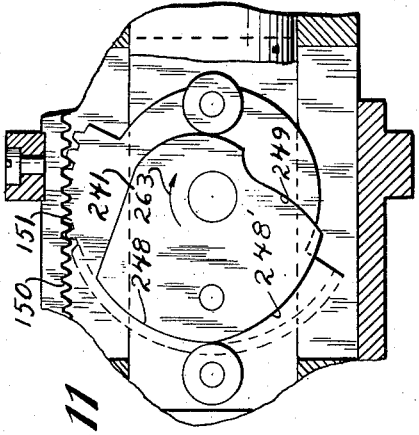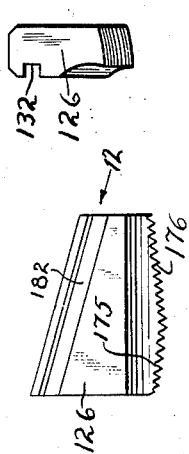

Patented Dec. 4, 1934

1,983,189

UNITED STATES PATENT OFFICE

1,983,189

THREAD CUTTING TOOL

Albert J. Prance, Detroit, Mich., assignor to Murchey Machine & Tool Company, Detroit, Mich., a corporation of Michigan Application June 13, 1932, Serial No. 616,942

4 Claims. (Cl. 10—145)

This invention relates generally to machine tools, and more particularly to an improved thread cutting tap construction by means of which screw threads may be cut more quickly and efficiently than is possible by taps of the types now in common use.

My invention has for a further important object provision of an automatic tap by means of which thread forms not now possible to produce by means of any tap construction known to the applicant may easily be cut.

The invention has for an additional object provision of such a tap by means of which not only may threads be formed in suitable apertures and materials with a minimum of difficulty and of elapsed time, but by running the tap through the aperture once only, after which the chasers are automatically retracted and the tool may be quickly removed.

Another object of my invention is the provision of such a tap incorporating automatically receding and expanding chasers, making possible the cutting of threads incorporating two or more tapers in a single chasing operation.

Another object of my invention is the incorporation in such a tap of improved cam controlling means for moving the chasers.

Still further objects will readily occur to those skilled in the art upon reference to the following description and the accompanying drawings in which Fig. 1 is a side elevation view of a collapsing tap incorporating the principles of my invention, showing the same with the chasers retracted.

Fig. 2 is a fragmentary side elevational view of the same showing the same with the chasers expanded to operative position.

Fig. 3 is an end view taken looking in the direction indicated by the arrow 3 of Fig. 1.

Fig. 4 is a longitudinal sectional view taken substantially on the line 4—4 of Fig. 3, and looking in the direction of the arrows.

Fig. 5 is a fragmentary view partly in side elevation and partly in section and substantially on line 5—5 of Fig. 3, looking in the direction of the arrows.

Fig. 6 is an end view taken looking in a direction opposite to that in which Fig. 3 is taken, substantially as indicated by the arrow 6 of Fig. 4.

Fig. 7 is a fragmentary side elevational view of the cam follower member, bringing out the manner of notching the same for cooperation with the spring retracting means.

Fig. 8 is a longitudinal sectional view of a somewhat modified form of my invention.

Fig. 9 is an end view thereof looking substantially in the direction of the arrow 9 of Fig. 8.

Fig. 10 is a transverse section taken substantially on the line 10—10 of Fig. 8, parts of the enlarged annular portion of the housing being broken away.

Figs. 11 and 12 are side elevational and end views respectively of an improved chaser construction suitable for use in conjunction with this embodiment of my invention.

Fig. 13 is a fragmentary view partly in section and partly in side elevation illustrating a somewhat modified cam construction which may be employed in a tap similar to that shown in Fig. 8, to adapt the same to cut single rather than double tapered threads.

Referring now to the drawings, reference character 15, (Figs. 1 to 7 inclusive) indicates the body of one form of my invention, integrally with which may be formed a shank 16 by means of which the device may be secured in the chuck of the machine in conjunction with which it is to be used. This form of my device is intended primarily for use in machines having stationary spindles, such as turret lathes, hand screw machines, and the like. Slidably mounted upon the substantially cylindrical body portion 15 is a collar 17 which is prevented from rotating with respect to the body, and the extent of its reciprocal travel limited, by a key 18 and slot 19. The key comprises a plug removably tapped in the enlarged annular portion 20 of the sleeve 17 and having an extremity 18' extending into the slot, as shown in Figs. 2 and 3. The sliding collar 17 is also yieldably held at opposite ends of its travel by means of a spring pressed detent plunger 21 having a rounded or chamfered end which is yieldably urged by the spring 22 into relatively shallow depressions 23—24 in the body of the tool. The detent plunger 21 is also housed in the ring portion 20 of the collar, as is also the spring 22, for which purpose an aperture 25 is formed substantially radially therein (note Fig. 5). An outer portion of the aperture 22 is reduced to form a slideway for the stem of the plunger 21, while the head of the plunger slides freely in the enlarged portion of the aperture. Axial sliding of the sleeve or collar with respect to the body of the tool expands and retracts the chasers by means of which the thread cutting operation is performed, in a manner which will be apparent as the description proceeds.

The chasers 26 are radially slidable in slots 27 formed to receive them in the forward extremity of the body of the tool.

A retaining cap 28 finishes the front end of the tool body, forming the front end of the chaser slots, and is apertured in axial alignment with the bore 29 in the tool body as at 28'. Radial sliding movement of the chasers is controlled by the axially reciprocable combined cam block and retaining member 30, which accurately fits within the bore 29. Slots 31 are formed upon the end of the slidable member 30, one of such slots being arranged in alignment with and directly beneath each of the slots 29 in the tool body. Each slot has an inclined bottom surface adapted to act as a cam for moving a chaser, and each pair of slots 27—31 forms a continuous slot in which one of the chasers is retained by an overhanging portion 31' of the slot 31, which engages a groove 32 in the side of the chaser. Each such key slot or groove 32 in the chaser extends adjacent and parallel to the bottom surface of the chaser, which is inclined complementarily to and rides upon the bottom of the cam groove 31, accurately fitting within the undercut portion of the groove in the manner shown in Fig. 6. It will be obvious that axial sliding movement of the member 30 will result in simultaneous radial movement of the chasers.

The particular tool here under consideration is intended to hold the chasers fixed during a threaded operation, and until it has been completed, and then to retract the chasers to enable separating the tool and work without having to unscrew one with respect to the other. For sliding the member 30 in the proper manner to accomplish this result, I provide a controlling cam 41 and a follower member 33, to which latter the retaining member is fixedly but adjustably connected as by means of the rod or adjusting screw 34, the ends of which are provided with threads of variant pitch, engaging complementarily tapped apertures 35—36 in the retaining and follower members respectively. This arrangement will be seen to enable relative adjustment of the positioning of the retainer and follower members by merely turning the adjusting screw, due to the differential effect of the threads of variant pitch. The retainer and follower members are prevented from turning relatively to each other in a suitable manner, as by means of the key 69. The forward extremity of the adjusting screw 34 may be socketed as at 37 to receive an Allen wrench or the like, and a jamb screw as 38 may be provided to rigidly fix adjusting screw 34 in desired positions. Instead of an ordinary socket, the jamb screw 34 may be provided with a hexagonal aperture adapted to receive a wrench of like size which may extend completely through the jamb screw or plug so that after loosening the same the wrench may be used to adjust the screw 34 without removing the jamb screw. By means of this adjustment it will be seen to be possible to vary the positioning of the chasers and so the diameter of the threads tapped by the device.

As shown in Figs. 4 and 7 the rear extremity of the follower member 33 may be slotted, as at 39 and a roller 40 may be journalled therein adapted to engage the face of a plate cam 41 pivoted in the body 15 as upon the pin 42. The roller is positively held against the face of cam by spring means which may comprise a compression spring 43 trapped in a slot 44 and acting upon the follower member thru the slidable block 45 which it urges in the direction indicated by the arrow 46 of Fig. 4. The block 45 carries a laterally projecting portion 47 at its forward extremity which engages a slot 47' in the side of the follower block 33 to draw the same in the desired direction. I preferably employ two such spring-retracting assemblies, one on each side of the body of the tool. Obviously, moreover, any other suitable spring means might be used to urge the chasers and retracting members toward indrawn position and prevent undesired relative movement between the cam and follower.

The cam shown in these views is formed with a face having a concentric portion 48, and a relatively sharply rising portion 49. Sliding movement of the collar 17 with respect to the body of the tool will be seen to turn the cam thru the agency of the ball 50 fixedly carried by the collar and engaging the socket 51 formed in the cam. The ball 50 is shown formed upon the inner end of a plug 52 removably threaded in a suitable aperture 53 in the enlarged ring portion 20 of the collar.

The collar may be slid over the body of the tool both manually, to enable projecting the chasers when it is desired to commence a new threading operation, and automatically upon engagement of the contact ring 60 with the work, to shift the collar rearwardly and so move the cam as to retract the chasers when the threading has proceeded to the desired depth, after which the tap may of course be quickly withdrawn. Manual sliding of the collar with respect to the tool may be accomplished by means of the handle lever 54 pivoted upon the pin 55 which traverses an aperture 56 in the annular portion 20 of the collar contoured to provide clearance for swinging movement of the lever. The inner extremity of the lever 54 carries a ball 57 engaging the socket 58 formed in the body of the tool (note Fig. 5).

A flange 59 is carried by the collar at its forward extremity to which is adjustably attached the forwardly projecting contact ring 60, as by means of bolts 61 and nuts 62. In a normal threading operation the chasers are first projected to the outward position by moving the handle 54 to the position shown in Fig. 5. The surface 48 of cam 41 will then be engaging the roller, in the manner shown in Fig. 4. The tapping operation is then performed in the normal or any desired manner, the work being, with the particular embodiment shown, rotated relatively to the tap, while one is also advanced upon the other. When the ring 60 contacts the work, further advance of one with respect to the other results in sliding the collar rearwardly, and so turning the cam in the direction indicated by the arrow 63 of Fig. 4. As soon as the concentric surface 48 leaves the roller 40, the assembly comprising the slidable blocks 33—30 will be moved rearwardly under the influence of spring 43, to thereby retract the chasers. The tool is then withdrawn from the work, and the device is ready for a succeeding tapping operation as soon as the chasers are again expanded.

By unscrewing the plug 18 to back the pin out of the slot 19, and sliding the sleeve 17 rearwardly farther than the pin and slot connection permits, the retainer 30 may be retracted far enough to clear the chasers, which may then be removed and replaced as desired, without the necessity of disassembling or removing any other portions of the device.

When it is desired to employ such a tap in a machine in which the tap itself is revolved, as in a tapping machine, drill press or the like, a suitable abutment or fixed contact means (not shown)

may be provided adapted to engage the collar 20 when the tool is retracted, to move the sleeve forwardly to expand the chasers.

In Figs. 8, 9 and 10 I have shown a somewhat modified construction by means of which the diameter of a thread being chased may be changed during a tapping operation. For this purpose I may substitute for the cam 41 one of variant contour (141) having a portion 148 of its face adapted to move the roller in a desired fashion during the threading operation, to first expand and then retract the chasers as desired, or even to do this repeatedly. The cam may be rotated by means of a rack 150 and gear 151, the former carried by the sliding collar 117 while the latter rotates as a unit with the cam, being here shown secured thereto by a pin 152.

In this embodiment of my invention (in which analagous portions of those described in connection with the first embodiment will be seen to have been given similar reference numerals 100 integers higher) the contact ring 160 is adjusted to contact the work at whatever point a variation in the diameter of the threads being shaped is desired to be effected. As the tool and work advance with respect to each other, the collar is forced rearwardly and the cam 141 turned in the direction indicated by the arrow 163 of Fig. 8, thereby moving the chasers in a manner determined by the contour of the cam. In the embodiment here shown, the cam is so contoured that during the threading operation the chasers are first slowly retracted and then slowly projected, in such manner that a double tapered thread (such as that of a pipe coupling) may be formed by passing the tap completely through a coupling from one end only. In forming the threads in such pipe couplings it is of course at present necessary to tap one tapered thread in from one end, turn the coupling around and tap the other thread in from the opposite end. By means of such an automatic tap as is here disclosed however, it is possible to tap both tapered threads in a single operation from one end of the coupling and to then automatically collapse the chasers so that the tap may be quickly removed. It will be seen that when the cam has been turned to the point where the roller 140 leaves the surface 148 and engages the surface 149, the cam follower will be moved rearwardly under the influence of springs 143 and the chasers retracted.

To limit the rearward movement of the sleeve portion 117 I preferably employ, in this embodiment, (rather than a plug or pin and slot connection such as that shown and described in connection with the first embodiment) a stop ring 181, which need be but partly and preferably less than semi-cylindrical, and frictionally held upon the body of the tool by the spring clip 182 which encompasses it and is somewhat more than semi-circular, these parts are preferably riveted, welded or otherwise suitably secured together, but the firmness with which they are secured to the tool, so long as they cannot fly off, is unimportant, since the thrust is taken by the rear flange 133, against which the stop 181 is compressed by the sleeve when the latter is moved rearwardly sufficiently. The stop of course prevents movement of the sleeve 117 rearwardly far enough to turn the cam 141 to the point where the retainer 130 clears the chasers to permit their removal, but when the stop ring is removed, the additional rearward movement thus made possible turns the cam until the retainer is free of the slots 132 of the chasers, whereupon the latter are freed and may fall or be pulled from the slots. The details of construction of such a semi-cylindrical stop ring are disclosed in Letters Patent issued to me January 10, 1928, numbered 1,655,563.

To enable such automatic tapping of double tapered threads in the manner described, I have designed a novel chaser of special form, the general contour of which is shown in Figs. 11 and 12. As there shown the chaser is formed with two distinct tapers. The angularity and the positioning of the apex of the angle depends upon the taper of the threads to be cut, and somewhat upon the material being worked.

In constructing such double receding or other taps for cutting threads of varying diameters I preferably extend the follower member 133 rearwardly, and employ two follower rollers, 140—140'. This enables positioning the spring means at the rear end of the device. In this embodiment I preferably employ four retracting springs, disposed as shown in Fig. 9, trapped in bores 144 in the tool body and urging the follower rearwardly thru the agency of the plate 145 secured upon its end, as by a screw 147.

In Fig. 13 I have shown a somewhat modified cam contouring which may be employed in a tap of the general construction shown in Figs. 8 and 10 but adapted to impart only a single receding movement to the chasers, such as is necessary in tapping ordinary tapered threads. The cam is designated 241 and may be motivated by a rack 250 and gear 251 in like fashion, these elements being fragmentarily shown. The surface 248 of the cam is concentric with respect to its axis, while the portion 248' recedes toward the axis at a constant rate to provide the desired taper. The cam is also provided with a sharply receding portion 249, and when following this, while the cam is rotating in the direction indicated by the arrow 263, the follower member retracts the chasers, and conversely throws them outwardly when the cam is turned in a reverse direction.

Now having described the invention and the preferred embodiment thereof, it is to be understood that the said invention is to be limited, not to the specific details herein set forth, but only by the scope of the claims which follow.

What I claim is:

1. In a thread-cutting device, a body portion, a chaser radially slidable therein, means including a plunger element longitudinally slidable in the body for moving the chaser in either direction, an anti-friction element carried by the plunger element, a rockable cam engageable with said anti-friction element, a cooperating gear and rack for rocking said cam, and means extending outside and movable longitudinally of the body for moving the rack upon advance of the tool with respect to its work.

2. In a thread-cutting device, a body portion, a chaser radially slidable therein, means including a plunger element longitudinally slidable in the body for moving the chaser, a pair of spaced anti-friction elements carried by the plunger element, a rockable positive return cam engaging both said anti-friction elements, and a cooperating gear and rack for rocking said cam.

3. In a thread-cutting device, a body having a nose portion, chasers radially slidable in said nose portion, a chaser cam axially slidable in the body and having tapered end portions for sliding the chasers, a thrust element connected to said cam and extending rearwardly to a point within the body, an anti-friction element carried by the rear end of said thrust element, a rockable cam engageable with said anti-friction element, a trip member arranged outside and movable longitudinally of the body, and means connecting said trip member and last mentioned cam to enable controlling radial movement of the chasers in response to actuation of the trip member.

4. In a device of the character described, a body, cutting elements radially slidable in the body, a plunger element longitudinally slidable in the body and connected to the chasers for radially actuating the same in either direction, a thrust portion connected to said plunger and slidably extended rearwardly but non-rotatable in the body, an anti-friction element carried by said thrust portion, a rockable cam engageable with said anti-friction element, a trip member arranged outside and movable longitudinally of the body, and means connecting said trip member and cam to enable controlling radial movement of the chasers in response to actuation of the trip member.

ALBERT J. PRANCE.